(12) United States Patent
Dixit et al.

(10) Patent No.: US 8,116,247 B2
(45) Date of Patent: Feb. 14, 2012

(54) ADAPTIVE MECHANISM FOR DYNAMIC RECONFIGURATION OF MESH NETWORKS

(75) Inventors: Sudhir Dixit, Woodside, CA (US); Suman Sarkar, Mountain View, CA (US)

(73) Assignee: Nokia Siemens Networks Oy, Espoo (FI)

( * ) Notice: Subject to any disclaimer, the term of this patent is extended or adjusted under 35 U.S.C. 154(b) by 756 days.

(21) Appl. No.: 12/075,500

(22) Filed: Mar. 11, 2008

(65) Prior Publication Data

US 2009/0232037 A1 Sep. 17, 2009

(51) Int. Cl.
*G08C 17/00* (2006.01)
(52) U.S. Cl. ............... 370/311; 455/69; 455/423
(58) Field of Classification Search .......... 370/311; 455/69
See application file for complete search history.

(56) References Cited

U.S. PATENT DOCUMENTS

| | | | |
|---|---|---|---|
| 2007/0161352 A1* | 7/2007 | Dobrowski et al. | 455/69 |
| 2007/0161371 A1* | 7/2007 | Dobrowski et al. | 455/423 |
| 2010/0189015 A1* | 7/2010 | Bragg et al. | 370/256 |

OTHER PUBLICATIONS

"Weakly Pulse-Coupled Oscillators, FM Interactions, Synchronization, and Oscillatory Associate Memory", Eugene M. Izhikevich, IEEE. Transactions on Meural Networks, vol. 10, No. 3, May 1999, pp. 508-526.
"From Kuramoto to Crawford: exploring the onset of synchronization in populations of coupled oscillators", Steven H. Strogatz, 2000 Elsevier Science B. V., pp. 1-20.
"Slowly Coupled Oscillators: Phase Dynamics and Synchronization", Eugene M. Izhikevich et al.
"Consensus and Cooperation in Networked Multi-Agent Systems", Reza Olfati-Saber et al., Proceedings of the IEEE, vol. 95, No. 1, Jan. 2007, pp. 215-233.
"The Neurosciences Institute", Eugene M. Izhikevich, http://vesicle.nsi.edu/users/izhikevich/publications/index.htm, Feb. 1, 2008, pp. 1-6.
"Weakly Connected Neural Networks", Franc C. Hoppensteadt et al., http://vesicle.nsi.edu/users/izhikevich/publications/wcnn.htm; Feb. 1, 2008, 114 pgs.

* cited by examiner

*Primary Examiner* — Albert T Chou
(74) *Attorney, Agent, or Firm* — Harrington & Smith

(57) ABSTRACT

In a wireless mesh network of network nodes, there is identified a first subset of the nodes that have a direct connection to at least one end user, and a second subset of nodes that are necessary to maintain connections among the end users. The first subset is exclusive of the second subset. Nodes that are not within either the first subset or the second subset enter a power savings mode, which may include shutting down completely for a predetermined period. This enables power savings in that only the minimum number of nodes that are necessary to maintain connectivity of the end users may remain powered. A centralized node may make the decisions and inform individual nodes to shut down, or each node may run the same algorithm using the same input information and determine its own shutdown decision.

25 Claims, 5 Drawing Sheets

ADAPTIVE MECHANISM FOR DYNAMIC RECONFIGURATION OF MESH NETWORKS

TECHNICAL FIELD

The teachings herein relate generally to wireless mesh networks, and are particularly related to determining which individual nodes may be turned off when such nodes are not needed for current conditions in the network and thereby dynamically configuring the network.

BACKGROUND

The following abbreviations and terms are herewith defined:

| | |
|---|---|
| AG | access gateway |
| BS | base station |
| IP | Internet protocol |
| Wi-Fi | WLAN based on the IEEE 802.11 |
| WiMAX | worldwide interoperability for microwave access (IEEE 802.16) |
| WLAN | wireless local area network |
| WMN | wireless mesh network |
| WNO | wireless node |

A mesh network is defined by a number of physical nodes arranged with full mesh topology where each node is connected directly to each other node or with partial mesh topology where nodes are connected to only some, not all, of the other nodes. While the topology at a particular configuration at a particular time may be hierarchical, a mesh network is not so limited and the topology enables many-to-many connections. A mesh network is also capable of dynamically updating and optimizing these connections. A WMN may be (but does not have to be) a "mobile network" in which at least some of the nodes of the network are mobile units (e.g., end users) that change position over time. In this regard the mobile user equipments act as a part of the WMN itself. Other WMNs do not employ user equipments to route traffic and rely on network-dedicated nodes, which may be fixed or mobile (e.g., mounted to a train). WMNs may communicate in accordance with various communication standards such as Wi-Fi and WiMAX, as non-limiting examples.

Within a WMN, a system that has a direct connection to an IP backbone is termed a mesh BS or AG. Usually there is no direct link from user devices to the BS/AG and traffic is routed through one or more hops over the network nodes. At least for scheduling, some WMNs use centralized scheduling where the AG or mesh BS collects the control and data packet information to determine the resource assignment for each WNO (router) and ensures that transmissions are coordinated to ensure collision-free scheduling. Other WMNs use distributed scheduling where each WNO (router) performs independent scheduling while coordinating with their extended neighbors. These different scheduling strategies are relevant for how embodiments of the invention detailed herein might be implemented, either centralized such as at the AG or distributed in each node.

WMNs have been rapidly deployed as a community (and federated) access network both in the developed as well as in the emerging telecommunications markets. It is reported that nearly seventy percent (70%) of the world's population lives in rural areas of developing or underdeveloped regions. But providing power to the network is expected to be a key design and performance aspect. In emerging markets, electrical supply is sometimes intermittent, unreliable or even non-existent. A WMN in these areas may need to rely on alternative sources of energy (e.g., batteries, solar, etc.), which are expensive. Conserving power in those areas helps in reducing the investment in alternative sources of energy, which can be expensive. In the developed market, although the electrical supply is reliable, conserving power helps in reducing network's operational costs and meeting certain environmental objectives. So conserving power in the wireless mesh network (WMN) serves the twin purposes of minimizing both the capital and operational expenditures of WMNs. Embodiments of this invention is seen to help address the power constraints of a WMN in such emerging markets so as to enable a WMN to be established more readily and operated more reliably given the electrical power constraints, as well as to conserve the less scarce electrical power in established economies.

From a power consumption perspective, there is much research into conserving battery power of battery-powered user devices by operating the radio interface (e.g., the transceiver) at a reduced power mode at certain times. Some research has also gone into that field for the network nodes (see for example US Pat. Publication 2007/0066329 which describes a technique for moving between active and standby modes for a base station of a cellular-type network). But the wireless nodes consume power on the order of watts, and only a small fraction (on the order of milliwatts) of that is consumed by its radio interface. So the largest gains in power conservation occur by turning off the WNOs completely if certain conditions are met, and some representative conditions might be loss of power, battery's reserve capacity falling below a threshold, and/or link inactivity.

For the WMN scenario the connectivity of the users through the network is not well-defined as it is in a hierarchical network. Determining which WNOs, and in fact determining if any of the WNOs, can be shut down is therefore not a straightforward task. The inventors are unaware of any specific research made public that details a solution to this particular problem. What is needed in the art is a way to determine which WNOs are necessary for connectivity through the WMN so that at least some of the remaining WNOs can be shut down, which is seen as enabling the potential for significant power savings without disrupting the network functionality. It would be particularly advantageous if such a determination were dynamic, so that more WNOs would be shut down at conditions of low traffic (e.g., midnight to 5 AM) when fewer of the WNOs are necessary for connectivity and so that fewer (if any) of the WNOs would be shut down at conditions of peak traffic.

SUMMARY

In accordance with one embodiment of the invention is a method that includes determining a first subset of nodes that have a direct connection to at least one end user, determining a second subset of nodes that is exclusive of the first subset that are necessary to maintain connections among the end users, and causing a node that is not within the first subset or the second subset to enter a power savings mode.

In accordance with another embodiment of the invention is an apparatus that includes a processor and a memory having a program. The processor running the program operates to determine a first subset of nodes that have a direct connection to at least one end user, to determine a second subset of nodes that is exclusive of the first subset that are necessary to maintain connections among the end users; and to cause a node that is not within the first subset or the second subset to enter a power savings mode.

In accordance with another embodiment of the invention is a memory embodying a program of machine-readable instructions that are executable by a digital data processor to perform actions directed toward determining which nodes of a network may enter a power savings mode. In this embodiment the actions include determining a first subset of nodes that have a direct connection to at least one end user, determining a second subset of nodes that is exclusive of the first subset that are necessary to maintain connections among the end users, and causing a node that is not within the first subset or the second subset to enter a power savings mode. Where the program is run in a centralized manner, causing the node that is not within the first subset or the second subset to enter the power savings mode may be implemented as sending a message to shutdown to each of the nodes that are not within the first subset or the second subset. Where the program is run in a distributed manner at each of the nodes, causing the node that is not within the first subset or the second subset to enter the power savings mode may be implemented on an individual node basis as the individual node shutting itself down if it sees it is not within the first subset or the second subset.

In accordance with yet another embodiment of the invention is an apparatus that includes processing means and computer program storage means and depowering means. The processing means and computer program storage means are for determining a first subset of nodes that have a direct connection to at least one end user, and for determining a second subset of nodes that is exclusive of the first subset that are necessary to maintain connections among the end users. The depowering means is for causing a node that is not within the first subset or the second subset to enter a power savings mode. In a particular embodiment, the processing means is a digital data processor and the computer program storage means is a computer readable memory. In the centralized algorithm embodiment the depowering means may be a transmitter for sending to each of the nodes that are not within the first subset or the second subset a message to shut down. In the decentralized algorithm embodiment the depowering means may be the digital processor for shutting down the node itself if it finds it is not within the first subset or the second subset.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Embodiments of this invention relate to conserving (electrical) power in a WMN while maintaining connectivity among the established users. The inventors have partitioned the problem of identifying which WNOs may be shut down into two related steps.

First, how to find the minimum number of WNOs necessary, necessary implying that proper connectivity to the end users is maintained. As above, turning off the WNO is much more effective at conserving power than operating it in a standby/reduced power state that is still powered. From a power consumption perspective, the minimum number of WNOs that need to be turned on in a WMN to maintain proper connectivity among the end users leads to the optimum number of WNOs that can be turned off. The more WNOs that are depowered, the more power is conserved.

Second, and related to the 'necessary' constraint of the first step above, is to ensure proper network connectivity. Even if a subset of the WNOs is turned off to conserve power, the rest of them should maintain a proper connectivity. Dynamically responding to the changes in the network states enables the network to adapt itself accordingly by finding a different subset of WNOs to turn off as conditions change. Such changes generally occur periodically over the span of a day (24-hour period). For example, during the night (i.e., midnight to 5 A.M.), the network usage typically wanes to the minimum, and during the daytime, it reaches its peak. These teachings include adapting to these network changes to decide the number and the locations of WNOs to turn off.

Figure 4A:
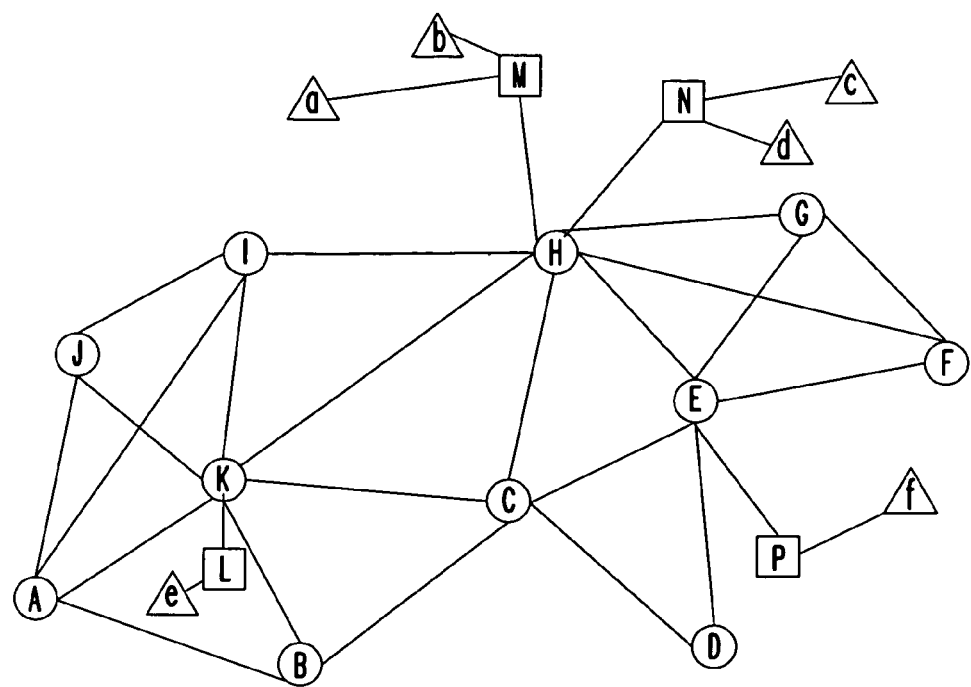
FIG. 4A is an arrangement of core nodes, access nodes and user equipments forming a wireless mesh network.

As a background to the following description, FIG. 4A illustrates a WMN. The end users are designated by triangles and lowercase letters a, b, c, d, e and f. All other nodes are the WNOs, and are shown as either as a square representing that the WNO is connected to an end user (nodes L, M, N and P) or a circle representing that the WNO is not connected to an end user (nodes A, B, C, D, E, F, G, H, I, J, K). At other times and under other traffic conditions any of the core nodes (circles) can operate as a non-core node (square) when they have a direct connection to an end user, and similarly as the end users move about and come online and go offline a non-core node (square) can become a core node (circle) when it no longer has a direct connection with an end user. For the special case where an end user device is used as a node of the network, such as a relay node for another end user, such an end user acting as network relay node is also considered as a network node for purposes of these teachings. As described herein the WNOs are under operational control of the network, else any decisions as to which WNO may be shut down cannot be put into effect and there is no power savings.

An important aspect of the invention is, given the locations of end users and of the wireless nodes (WNOs), to find the minimum number of WNOs necessary to maintain proper connectivity in the WMN. After identifying these necessary WNOs, the rest of the WNOs can be turned off to conserve power. Then, depending on the changes in the WMN, these teachings dynamically adapts the network and finds a new subset of WNOs to turn off.

The problem of finding the minimum number of WNOs that are necessary may be formulated as follows:

Inputs:
1) coordinates of the end users=(x, y);
2) number of end users=n;
3) coordinates of WNOs=(X, Y); and
4) Number of WNOs=N.

Output: Minimum number (K) of WNOs necessary for proper connectivity.

The objective is to maximize the power savings in the WMN, and the constraint is to maintain adequate connectivity.

According to an embodiment of the invention, the solution may be conveniently considered as being in two parts, a two-stage or two-phase algorithm. Phase 1 deals with finding the WNOs that are directly associated with at least one end user. At a particular snapshot (in time) of the WMN, all those WNOs are identified that are directly associated with an end user. These are shown as the squares in FIG. 4A, and conventionally termed "one hop" WNOs. These "one hop" WNOs should necessarily be turned on and need to stay on to serve the end users. However, in some circumstances it may be possible to consolidate the end user connections among a smaller number of one-hop WNOs that there are at the current 'snapshot'. This leaves the necessary one-hop WNOs.

Phase 2 of the algorithm begins with identifying the remaining WNOs (i.e., all WNOs minus all of the "one hop" WNOs which were identified in Phase 1). The remaining WNOs are conventionally termed the "core" WNOs, and shown in FIG. 4A as the circles. "Core" WNOs are not associated with any end user. Thus at the time of the 'snapshot' they are only used for routing traffic to "one hop" WNOs. This second phase of the algorithm finds the minimum number of "core" WNOs that are necessary to maintain the connectivity of the end users. This ensures that the traffic from any end user can reach any other end user through the minimum number of the remaining "core" WNOs. Thus at the end of the process, the only WNOs that remain powered are the "one hop" WNOs that are deemed necessary for end user connectivity plus the "core" WNOs that are deemed necessary for end user connectivity.

This algorithm may be broadly stated as determining a first subset of nodes that have a direct connection to at least one end user (the one-hop nodes), determining a second subset of nodes that is exclusive of the first subset that are necessary to maintain connections among the end users (the necessary core nodes), and then causing a node that is not within the first subset or the second subset to enter a power savings mode. For maximum power savings the second subset is the minimum number of nodes that are necessary to maintain connections among the end users, and the power savings mode is a depowered state (though some implementations may find it fruitful to have the node simply enter a standby state with its corresponding reduction in power savings).

For the case where there is a centralized control within the WMN such as a WMN that uses centralized scheduling, the centralized node may execute the algorithm and send messages to the nodes that are to enter the power savings mode. For the case where there is no centralized control node such as where the WMN uses distributed scheduling, each individual WNO can perform the algorithm with input only from its neighbors and the aggregate individual actions by each of the nodes will achieve the same result, though in some instances the actual minimum number of core nodes may not be found if the amount of control signaling is limited so as to balance between power savings and network control traffic. For example, all of the distributed network nodes can send out a poll to their neighbors, or they can automatically report their connection status to their neighbors at a predetermined time of a 24-hour cycle. Any depowered node would power up at this time in order to enable full reconfiguration of the network. Taking nodes of FIG. 4A as examples, node L would send to its sole neighbor K some control signaling that it has a direct connection to a user, node K would send control signaling to its neighbor nodes A, B, C, H, I and J (and also possibly L) that it has connectivity to an end user through node L only and no others, node I would send control signaling to its neighbor nodes H, J and K that it has no connectivity to an end user (or the lack of signaling can indicate lack of connectivity), and so forth. Thus the overall 'snapshot' is not compiled at a particular centralized node but piecemeal at the various nodes of the WMN. After receiving the reports from the various neighbor nodes, node L knows it must remain powered due to its connectivity to the end user e, node K knows it must remain powered due to its connectivity through node L, and node I knows that it supports no connectivity and can shut down or enter some other low power state.

More detailed control signaling can be used to determine which if any existing connections between the core nodes could be eliminated while still maintaining connectivity for the end users. For example, if user f is connected to user e through the node sequence P-E-C-K-L, it may be that the connections between E-C-K can be severed in favor of another connection through nodes E-H-K that is also necessary for different end user connections. More detailed signaling would enable the distributed nodes to determine that the node E-H-K connection can be used for end users f and e, enabling node C to shut down.

Since WMN is generally a fixed wireless mesh (unlike a dynamic ad-hoc network) where the positions of the WNOs are known, a centralized algorithm will generally perform better than distributed ones. However, with proper signaling mechanisms, the same result may be achieved when the algorithm is run in the distributed fashion as well.

To know the neighbors in a WMN, the nodes will construct an initial topology, for example where every node exchanges "hello" packets or similar presence information to all other nodes. It is advantageous that the WNOs construct their "one-hop" neighbor topology first. From these "one-hop" neighbors a WNO can construct its "two-hop" neighbors (a "two-hop" neighbor of a WNO is its "one-hop" neighbor's "one-hop" neighbor), and so on. By itself this is a common practice for initializing a network.

Besides sending the information of other neighboring WNOs, a "one-hop" WNO will also send the information about its end users' connectivity as noted above. Assume end user f is (initially) associated with multiple WNOs, namely WNO P and WNO F. Both WNO P and WNO F will advertise that they can see that same end user f associated with them. Using the centralized algorithm model, a central WNO learns from WNO P and WNO F that both are serving the same end user f and will decide which of those two WNOs will serve that end user f depending on some criteria, such as their respective signal strengths, load balancing, or the like. At FIG. 4A the choice is that the connection to user f is maintained through node P, and so node F can be shut down.

Even with a centralized algorithm, a node which is responsible for running the algorithm in a first instance can transfer its responsibility for running the algorithm to one of its neighboring nodes before turning itself off as the algorithm might demand from time to time. This is possible because all the network nodes have the consistent topology information due to their periodic "hello" packet exchanges, which every node can receive, not only the centralized node.

Thus the algorithm may be considered as centralized, but can actually be implemented in a distributed manner since all of the nodes have the potential to independently know all the information needed to run the algorithm. For full distributed operation there may be an absence of shutdown signaling from a node that operates as the centralized node. In this case each node will come to the same conclusion as to which nodes should be shut down so long as every node runs the identical algorithm with the identical inputs (topology from hello packets, end user connectivity data, and identical criteria for which of multiple nodes connected to the same end user is to take priority for maintaining connectivity to that user). If an individual one of these distributed nodes finds itself on the shutdown list generated by the algorithm, it can simply comply and shutdown without explicit signaling from a centralized node.

But whether implemented by a centralized node that signals individual nodes to power down or by each individual distributed node that makes its own de-power decision autonomously using control signaling/hello packets from its neighbors, the essence of the algorithm is the same. Following are more detailed steps of the different phases described in the context of a centralized control node that determines the optimum configuration for the WMN and instructs the affected nodes to shut down or otherwise enter a low power state.

Figure 1:
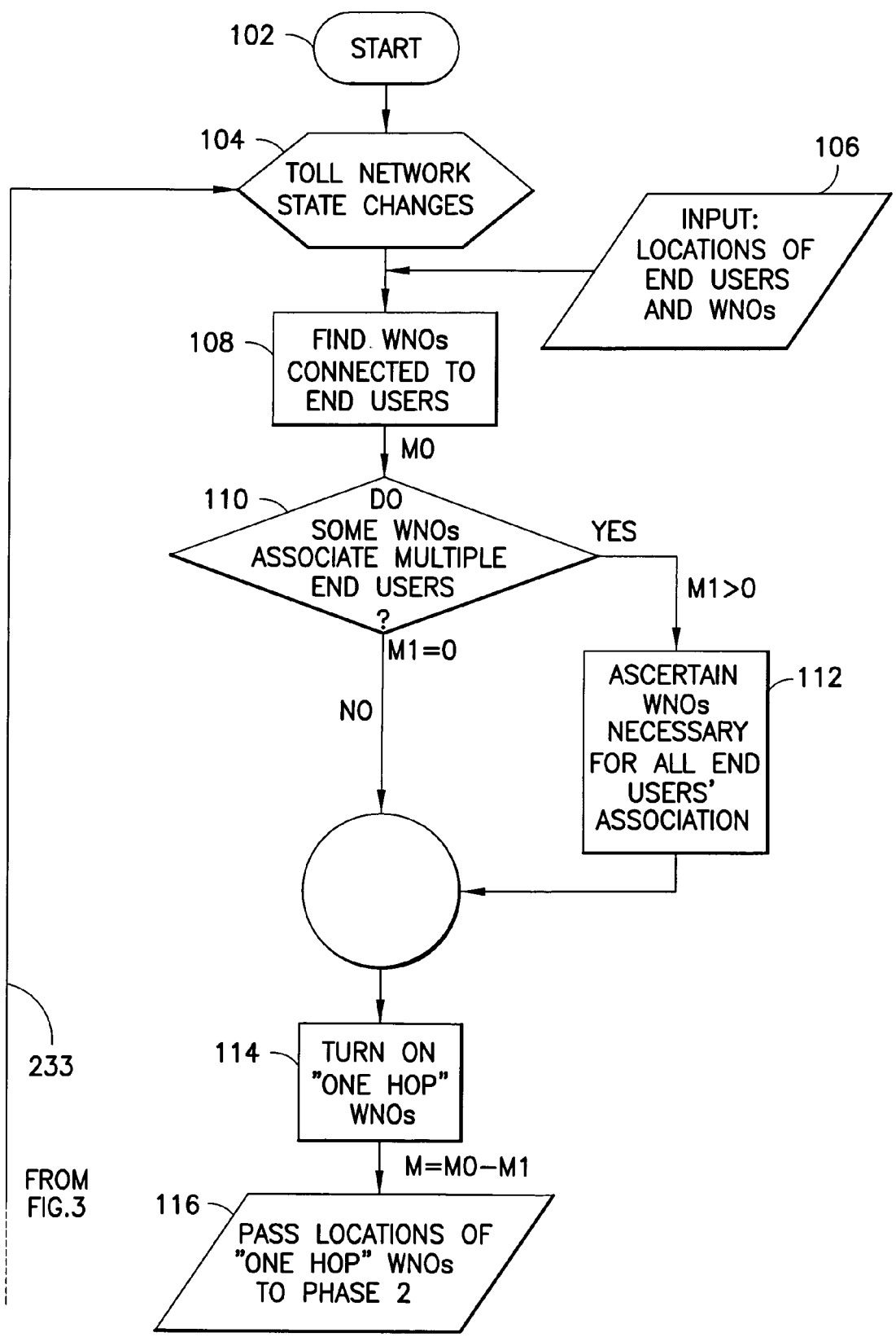
FIG. 1 is a first portion of a flow diagram illustrating process steps according to an embodiment of the invention.

Phase 1 is shown with particularity at FIG. 1. As above, the start block 102 may be at predetermined times (e.g., hourly, midnight and 5 AM, etc.) or anytime the centralized node chooses to optimize the WMN's configuration. Network state changes are stored at block 104 based on the feedback 350 to be detailed with respect to FIG. 3. Given the locations of the end users (x, y) and the locations of the WNOs (X, Y) at block 106, then block 108 identifies those WNOs which all the end users (there are 'n' end users) are connected to. Represent this universe of all the one-hop WNOs at the time of the 'snapshot' as the integer "M0", and the M0 nodes form a list. At block 110 are identified, from the universe of "M0" one-hop WNOs, that subset 'M1' of the WNOs who connects only users (A WNO can have direct connectivity to more than one end user) that are already covered by other WNOs. If in fact the number M1 of one-hop WNOs having connectivity only to end users that overlap with other WNOs at block 110 is non-zero, then block 112 ascertains the WNOs [(M0–M1) of them] that are necessary for end users' association to the rest of the WMN. The number of necessary one-hop WNOs is then M=M0–M1, where a one-hop WNO has direct connectivity to an end user. The question at block 112 is done iteratively for each of the M0 nodes on the list, to avoid the condition of eliminating two WNOs that each have connectivity to only the same end user. Iterative processing ensures that once one of those two WNOs is eliminated from the list, the other will not be. At block 114, the centralized network control node turns on all of the necessary "one hop" WNOs ('M' of them) and keep them on until end users association changes. The reverse of block 114 is also true, the centralized control node turns off all of the one-hop WNOs that were not determined to be a necessary one-hop WNO, but this occurs later (in phase 2 of the algorithm). Considering that this is a dynamic reconfiguration of the already operating network, the centralized node ensures that all of the necessary one-hop WNOs are turned on. This is the completion of phase 1 of the algorithm, which may be considered a reduced list of size M; the list output from block 108 of size M0 reduced by any M1 WNOs at block 112. This list is passed at block 116 to phase 2 of the algorithm.

In phase 2 the core network nodes are identified, classified and turned off except where classified as necessary for connectivity that arises from phase 1. Given the locations at block 202 for those WNOs on the list of necessary WNOs at block 116, the core WNOs are identified at block 204. If we consider that there are a total of N WNOs in the network at the time of the 'snapshot', then block 204 identifies a total of N-M WNOs as being core WNOs, and makes them into a first list of core WNOs. These N-M WNOs are only used for routing traffic, since the one-hop WNOs have been identified at the first phase. Note that if there were any M1 WNOs that no longer have direct connectivity due to consolidating the end users among the minimum number M of one-hop WNOs in phase 1, then in an embodiment those M1 WNOs are no longer one-hop WNOs and may be considered to lie within the universe N–M of core WNOs in the first list output from block 204.

Block 206 is a feedback entry to be detailed below. Block 208 examines the first list (which originally is size N–M) and finds the WNO which has the minimum number of other WNOs connected to it whether core WNOs or one-hop WNOs. This ensures that the algorithm works inward from the one-hop nodes, since the necessary one-hop nodes will have a connection with a core node on the first list at the time of the snapshot. Blocks 208 through 226 are iterative and repeat for each node of the first list output from block 204 until the first list is empty at block 206. In general, as each node is evaluated by the algorithm blocks 208-226, it is removed from the first list and either dropped as unnecessary or added to a second list of necessary core nodes.

At block 210, for the individual core node from the first list being evaluated, it is determined whether a connection to any of the end users would be maintained if this core node was dropped, and the end users are those same ones used to form the list that was output from the first phase and FIG. 1. If yes, then at block 216 that WNO is removed from the first list and it is checked at block 218 if any WNO that is connected to this removed WNO is in the second list, which is the list of necessary core nodes. At first this second list is empty, and so path 219 leads to block 220 at FIG. 3. If no WNO is present in the second list of necessary "core" nodes (which is connected to the dropped node), another WNO (term this "W" temporarily) that is connected to the dropped WNO that has maximum connectivity to other WNOs is found from the first list. Consider an example, node D of FIG. 4A is being evaluated in the iteration of Phase 2. Node D is evaluated first (Pass 1 of the table below) because block 208 shows it to have minimum connectivity: it is connected only to nodes C and E. Node D will be determined at block 216 to be dropped from the list of core nodes because block 210 says it is not necessary. The "W" node (node E in the example) is then added to the second list at block 222 (since the one-hop node P is connected only to routing node E), which is the necessary core nodes, and removed from the first list since there is no need to process it through blocks 208 onward. No decision is made yet for node C. At block 226 since the first list of core nodes is not yet empty, path 227 is followed back to block 206 and the next node is processed in order of minimum connectivity. Node C is processed at Pass 8 of the table below since it has 4 connections (node D being previously eliminated), and in that iteration it is determined that node C is not necessary for connectivity. For the case where a node is removed and a connected node is already on the second list, there is no need to find maximum connectivity since by default it will already be in the second list and path 217 returns to the iteration beginning at block 206. If at block 208 it is determined that dropping a node will destroy connectivity for one of the end users, then at block 212 that node is added to the second list and at block 214 that same node is removed from the first list.

Figure 3:
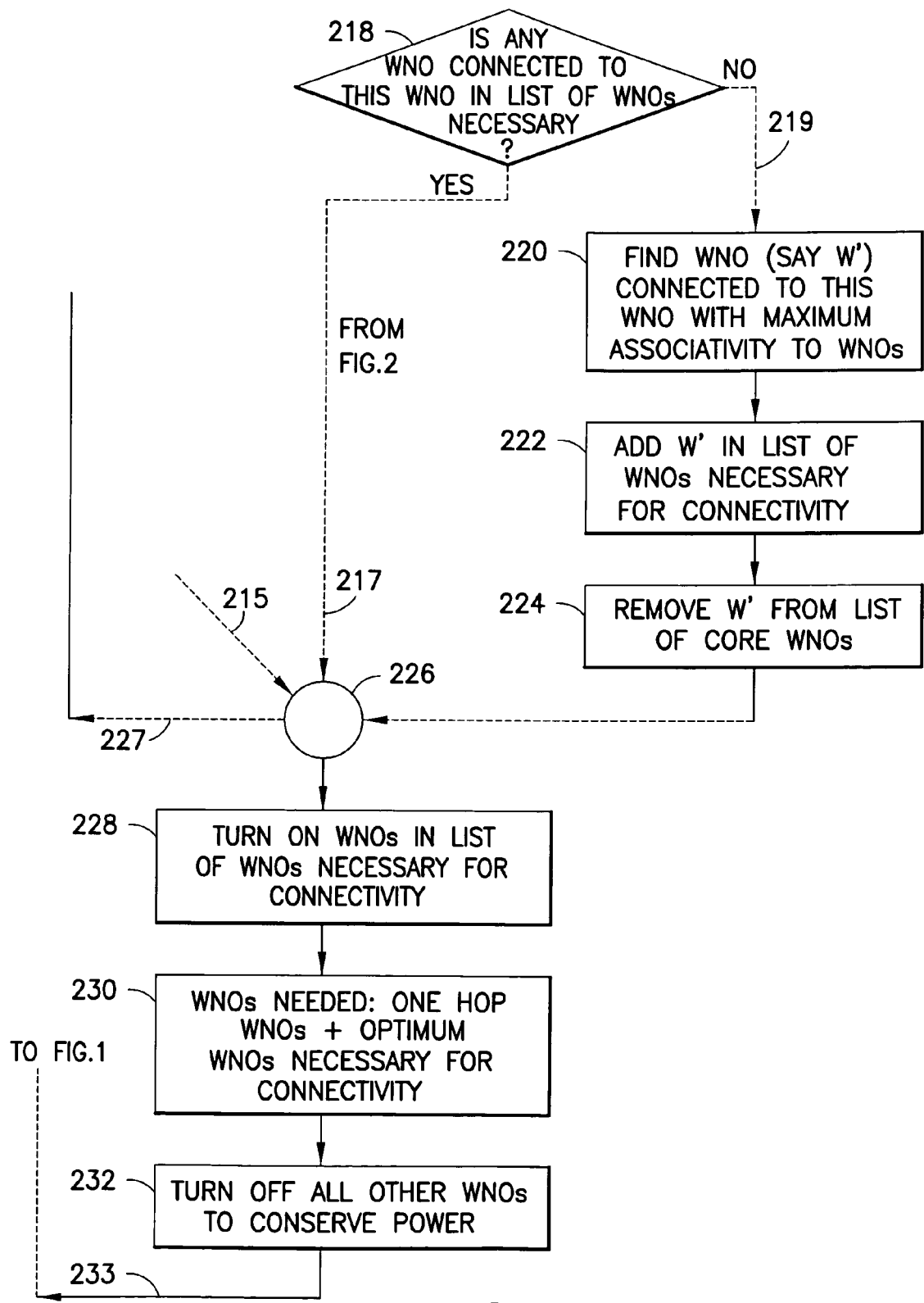
FIG. 3 is a third and final portion of the flow diagram that continues from FIGS. 1 and 2.

When all core nodes have been processed the first list will be empty, at which time block 228 of FIG. 3 indicates to turn on the core WNOs in the second list. It may be that some are off and the connections were not optimized for the traffic at the time of the snapshot even though connectivity was intact. At block 230 the centralized network node determines all of the necessary nodes: those on the list output at block 116 (M one-hop nodes) plus those necessary core nodes that are on the second list output at block 228. Consider all of these necessary nodes as numbering K, so K is equal to the sum of the necessary one-hop nodes on the list output from phase 1 (M WNOs) and the necessary core nodes on the second list output from phase 2. Since each of those K necessary nodes have already been turned on previously (at blocks 114 and 228), then at block 232 the centralized node turns off all of the nodes that are not on either of those lists since none of them have been deemed necessary.

Path 233 begins the algorithm again. As above, it may be run periodically based on routine traffic patterns ebbing and flowing between daily peak and low periods. More robustly, the algorithm may be run whenever the state of network changes, which may arise due to any number of reasons such as end user associativity, WNOs' connectivity, actual traffic/congestion conditions (as opposed to anticipated), node failure, etc.

Figure 2:
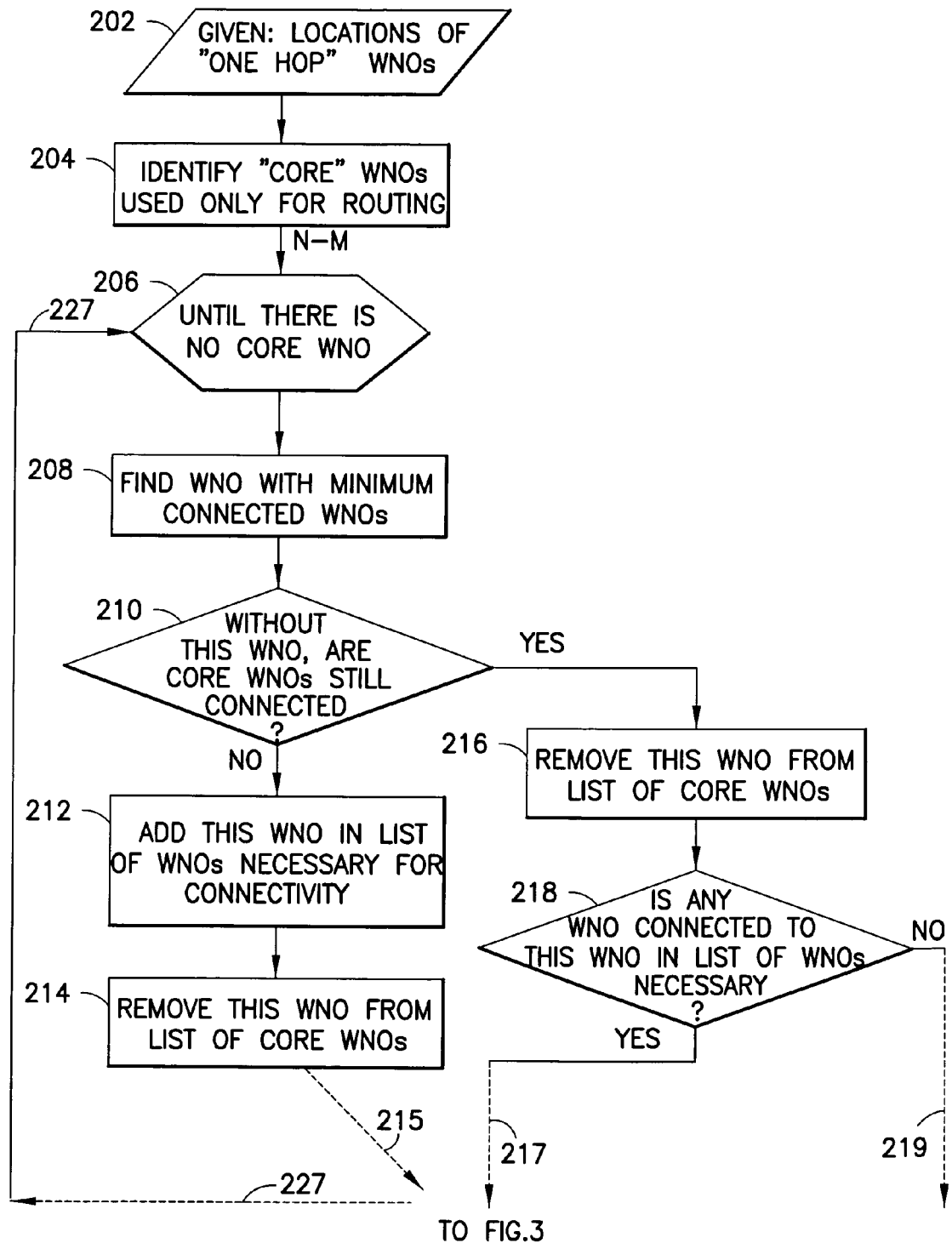
FIG. 2 is a second portion of the flow diagram that continues from FIG. 1.
Figure 4B:
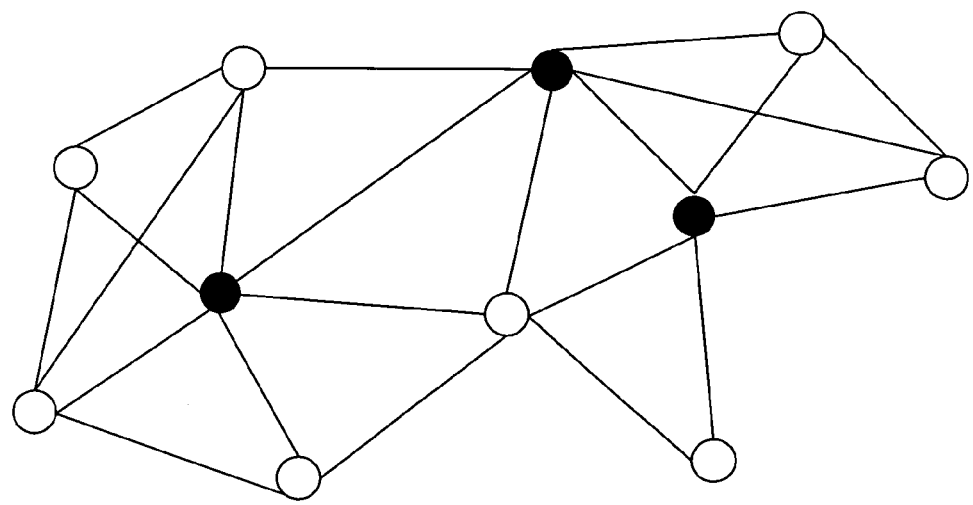
FIG. 4B is the core node arrangement of FIG. 4A with the necessary core nodes identified by shading and the remaining core nodes appropriate to be shut down for power conservation.

Now consider a specific example at FIGS. 4A to 4B. FIG. 4A has been described above, and assume that the first phase is complete and none of the one-hop nodes L, M, N and P can be eliminated and so they are all necessary. The following table shows results of each iterative step through phase 2 of the algorithm as shown at FIGS. 2-3 for each of the core nodes A through K.

| Illustration of Phase 2 of algorithm (with FIGS. 2-3) | | | |
| --- | --- | --- | --- |
| Passes of algorithm | Remaining Core WNOs | Candidate WNOs that may be turned off | WNOs necessary for connectivity |
| Initialization | A, B, C, D, E, F, G, H, I, J, K | Null | Null |
| Pass 1 (node D) | A, B, C, F, G, H, I, J, K | D | E |
| Pass 2 (node F) | A, B, C, G, H, I, J, K | D, F | E |
| Pass 3 (node G) | A, B, C, H, I, J, K | D, F, G | E |
| Pass 4 (node B) | A, C, H, I, J | D, F, G, B | E, K |
| Pass 5 (node A) | C, H, I, J | D, F, G, B, A | E, K |
| Pass 6 (node J) | C, H, I | D, F, G, B, A, J | E, K |
| Pass 7 (node I) | C, H | D, F, G, B, A, J, I | E, K |
| Pass 8 (node C) | H | D, F, G, B, A, J, I, C | E, K |
| Pass 9 (node H) | Null | D, F, G, B, A, J, I, C | E, K, H |

One embodiment of the algorithm may be stated concisely as follows:

Algorithm: To find the number of WNOs necessary for proper connectivity

Phase 1:
1. Given the locations of end users (x, y) and the locations of WNOs (X, Y), identify those WNOs which all the end users (say 'n' of them) are connected to.
2. Among these WNOs (say 'M0' of them), find WNOs (say 'M1' of them), if any that are connected to some end users who are already covered by other WNOs.
3. Ascertain the WNOs [(M0-M1) of them] that are necessary for end users' association to the rest of the WMN. Call these WNOs "one hop" WNOs (say 'M' of them, where M = M0 − M1).
4. Turn on all "one hop" WNOs ('M' of them) and keep them on until end user's association changes.

Phase 2:
1. Given the locations and number of "one hop" WNOs (as produced by Phase 1 of this Algorithm), identify "core" WNOs [(N-M) of them] which should only be used for routing traffic.
2. Consider: S1 = {(X, Y)|(X, Y) belongs to 'M' "one hop" WNOs}, S2 = {(X, Y)|(X, Y) belongs to 'N-M' other WNOs}, S3 = {empty set}. Also consider every WNO in S1 is a neighbour of at least one WNO in S2 and WNOs in S2 are themselves connected.
3. In S2, find the WNO (say W), which connects to minimum number of WNOs in S2.
4. Check if, without W, the WNOs in S2 are connected to themselves.
    a. If they are still connected, go to Step 5;
    b. Else (if they are NOT connected), add this WNO to S3. Therefore, S3 = {{S3} + W}, S2 = {{S2} − W}. Go to Step 7.
5. Remove the WNO from S2, i.e., S2 = {{S2} − W}.
6. Check if any connected WNO of this WNO (i.e., W) is already in the WNOs in S3.
    a. If yes, go to Step 7.
    b. If no, find the connected WNO (say W') of W, which has the maximum number of associativity to WNOs. Add this WNO to S3. Therefore, S3 = {{S3} + W'}, S2 = {{S2} − W'}.
7. Do Step 3-6 recursively until S2 is empty.
8. Find the minimum number of "core" WNOs necessary for adequate connectivity in WMN: |S3|. Turn on these WNOs.
9. Find the total number of WNOs needed: K = "one hop" WNO + "core" WNO = M + |S3|.
10. Turn off all other WNOs [i.e., (N-K) of them] to save power.
11. Run this algorithm whenever the state of network changes (due to several reasons, namely end user associativity, WNOs' connectivity, traffic/congestion, failure, etc.) and update K.

Figure 5:
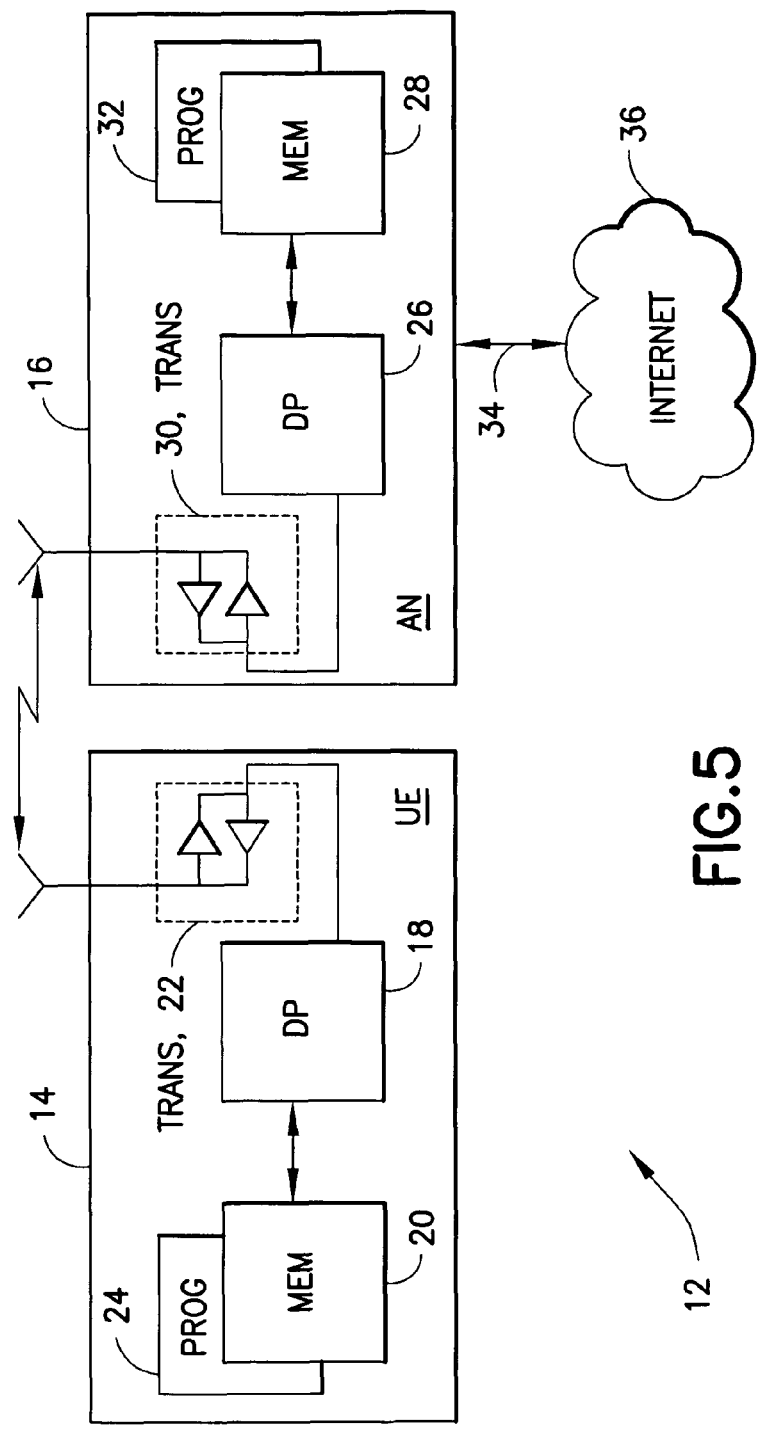
FIG. 5 shows a simplified block diagram of various electronic devices that are suitable for use in practicing the exemplary embodiments of this invention.

Reference is now made to FIG. 5 for illustrating a simplified block diagram of various electronic devices that are suitable for use in practicing the exemplary embodiments of this invention. In FIG. 5 a wireless network is adapted for communication between a user equipment/end user 14 and a WNO 16, shown as an access node AN since it has a connection 34 to the Internet 36 but understanding that the WNO 16 can be a one-hop node with a direct connection to the UE 14 as shown or a core node that is directly connected to no UEs. The UE 14 may also serve as a relay node of the WMN at certain times and for certain embodiments of the WMN. The UE 14 includes a data processor (DP) 18, a memory (MEM) 20 that stores a program (PROG) 24, and a suitable radio frequency (RF) transceiver 22 coupled to one or more antennas (one shown) for bidirectional wireless communications over one or more wireless links with the WNO 16. The WNO 16 also includes a DP 26, a MEM 28 that stores a PROG 32, and a suitable RF transceiver 30 coupled to one or more antennas. The WNO 16 may be coupled via a data path 34 to the Internet 36 directly or to other WNOs. Whether a UE 14 acting as a relay node in a WMN, a one-hop WNO or a core WNO that is or is not also an AP, so long as the device/apparatus is acting as a node of the WNO it can embody elements of the invention detailed above.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the PROGs 24, 32 is assumed to include program instructions that, when executed by the associated DP, enable the electronic device to operate in accordance with the exemplary embodiments of this invention, as detailed above. Inherent in the DPs 18, 26 is a clock to enable synchronism among the various apparatus for transmissions and receptions within appropriate time intervals and slots as may be required by the specific WMN protocol in use.

The PROGs 24, 32 may be embodied in software, firmware and/or hardware, as is appropriate. In general, the exemplary embodiments of this invention may be implemented by computer software stored in the MEM 28 and executable by the DP 26 of the AN 16 and similar for the other MEM 20 and DP 18 of the UE 14 (acting as relay node), or by hardware, or by a combination of software and/or firmware and hardware in any or all of the devices shown.

In general, the various embodiments of the UE 14 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory. The DPs 18, 26 and 14A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
 operating a processor to:
 determine a first subset of nodes that have a direct connection to at least one end user;
 determine a second subset of nodes that is exclusive of the first subset, wherein each of the members of the second subset is necessary to maintain connections among two or more end users requiring connectivity with one another to be maintained;

wherein the first subset of nodes and the second set of nodes belong to a set of nodes of a wireless network that are configured to enter a power savings mode removing their capability to maintain connections among end users, and wherein each member of the set of nodes alternates between being a member of the first subset, a member of the second subset, or a member of neither the first subset or the second subset, depending on conditions within the network; and configure an apparatus to cause a node that belongs to the set of nodes but is not within the first subset or the second subset to enter the power savings mode.

2. The method of claim 1, wherein the power savings mode is a depowered state.

3. The method of claim 1, wherein the processor resides in a centralized node of a wireless mesh network and wherein determining the first and second set of nodes is conducted for all nodes in the network.

4. The method of claim 1, wherein the processor resides in an individual node of a distributed wireless mesh network, wherein determining the first and second set of nodes is conducted for all neighbor nodes, and wherein the individual node executing the method is not within the first subset or the second subset.

5. The method of claim 1, wherein determining the second subset of nodes comprises making a first list of all core nodes and iteratively eliminating from the first list and adding to a second list of necessary core nodes, each core node from the first list that has at least one connection that is necessary to maintain connectivity of one of the end users.

6. The method of claim 5, wherein iteratively eliminating further comprises examining each node on the first list and eliminating the node from the first list if it does not have at least one connection that is necessary to maintain connectivity of one of the end users and is not necessary for connectivity to any of the nodes on the second list, until the first list of all core nodes is empty.

7. The method of claim 6, wherein for each node that is eliminated from the first list that does not have at least one connection that is necessary to maintain connectivity of one of the end users and that is not necessary for connectivity to any of the nodes on the second list, the iteration for that node further comprises adding to the second list a node connected to the node of the iteration that has maximum connectivity to other nodes in the network.

8. The method of claim 7, wherein causing a node that is not within the first subset or the second subset to enter a power savings mode comprises turning off all of the nodes except those that are in the second list and those that are in the first subset.

9. The method of claim 1, wherein determining the first subset of nodes comprises:

making a list of all nodes that have direct connectivity to an end user;

iteratively removing from the list each individual node that does not have exclusive connectivity to an end user as compared to other nodes on the list; and outputting the first subset after iterating through all of the nodes on the list.

10. An apparatus comprising:

at least one processor; and a memory storing a program of instructions which, when executed by a processor, cause the apparatus to:

determine a first subset of nodes that have a direct connection to at least one end user;

determine a second subset of nodes that is exclusive of the first subset, wherein each of the members of the second subset is necessary to maintain connections among two or more end users requiring connectivity with one another to be maintained;

wherein the first subset of nodes and the second set of nodes belong to a set of nodes of a wireless network that are configured to enter a power savings mode removing their capability to maintain connections among end users and wherein each member of the set of nodes alternates between being a member of the first subset, a member of the second subset, or a member of neither the first subset or the second subset, depending on conditions within the network; and cause a node that belongs to the set of nodes but is not currently within the first subset or the second subset to enter the power savings mode.

11. The apparatus of claim 10, wherein the power savings mode is a depowered state.

12. The apparatus of claim 10, wherein the apparatus is a centralized node of a wireless mesh network and the program operates to determine for all nodes in the network.

13. The apparatus of claim 10, wherein the apparatus is an individual node of a distributed wireless mesh network and the program operates to determine for all neighbor nodes, wherein the individual node is not within the first subset or the second subset.

14. The apparatus of claim 10, wherein the apparatus operates to determine the second subset of nodes by making a first list of all core nodes and iteratively eliminates from the first list, and adds to a second list of necessary core nodes, each core node from the first list that has at least one connection that is necessary to maintain connectivity of one of the end users.

15. The apparatus of claim 14, wherein for each node on the first list, the processor operates to iteratively eliminate each node from the first list that does not have at least one connection that is necessary to maintain connectivity of one of the end users and that is not necessary for connectivity to any of the nodes on the second list, until the first list of all core nodes is empty.

16. The apparatus of claim 15, wherein for each node that is eliminated from the first list that does not have at least one connection that is necessary to maintain connectivity of one of the end users and that is not necessary for connectivity to any of the nodes on the second list, the iteration for that node further comprises adding to the second list a node connected to the node of the iteration that has maximum connectivity to other nodes in the network.

17. The apparatus of claim 16, wherein the apparatus operates to cause a node that is not within the first subset or the second subset to enter a power savings mode by directing a transmitter to send an instruction to turn off all of the nodes except those that are in the second list and those that are in the first subset.

18. The apparatus of claim 10, wherein the apparatus operates to determine the first subset of nodes by:

making a list of all nodes that have direct connectivity to an end user;

iteratively removing from the list each individual node that does not have exclusive connectivity to an end user as compared to other nodes on the list; and outputting the first subset after iterating through all of the nodes on the list.

19. A non-transitory memory embodying a program of machine-readable instructions which, when executed by a processor, cause actions comprising:
- determining a first subset of nodes that have a direct connection to at least one end user;
- determining a second subset of nodes that is exclusive of the first subset, wherein each of the members of the second subset is necessary to maintain connections among two or more end users requiring connectivity with one another to be maintained;
- wherein the first subset of nodes and the second set of nodes belong to a set of nodes of a wireless network that are configured to enter a power savings mode removing their capability to maintain connections among end users, and wherein each member of the set of nodes alternates between being a member of the first subset, a member of the second subset, or a member of neither the first subset or the second subset depending on conditions within the network; and
- causing a node that belongs to the set of nodes but is not currently within the first subset or the second subset to enter a power savings mode.

20. The memory of claim 19, wherein determining the second subset of nodes comprises making a first list of all core nodes and iteratively eliminating from the first list, and adding to a second list of necessary core nodes, each core node from the first list that has at least one connection that is necessary to maintain connectivity of one of the end users.

21. The memory of claim 20, wherein iteratively eliminating further comprises, for each node on the first list, eliminating each node from the first list that does not have at least one connection that is necessary to maintain connectivity of one of the end users and that is not necessary for connectivity to any of the nodes on the second list, until the first list of all core nodes is empty.

22. The memory of claim 21, wherein for each node that is eliminated from the first list that does not have at least one connection that is necessary to maintain connectivity of one of the end users and that is not necessary for connectivity to any of the nodes on the second list, the iteration for that node further comprises adding to the second list a node connected to the node of the iteration that has maximum connectivity to other nodes in the network.

23. The memory of claim 22, wherein causing a node that is not within the first subset or the second subset to enter a power savings mode comprises turning off all of the nodes except those that are in the second list and those that are in the first subset.

24. The memory of claim 19, wherein determining the first subset of nodes comprises:
- making a list of all nodes that have direct connectivity to an end user;
- iteratively removing from the list each individual node that does not have exclusive connectivity to an end user as compared to other nodes on the list; and
- outputting the first subset after iterating through all of the nodes on the list.

25. An apparatus comprising:
- processing means and computer program storage means for:
- determining a first subset of nodes that have a direct connection to at least one end user, and for determining a second subset of nodes that is exclusive of the first subset that are necessary to maintain connections among two or more end users requiring connectivity with one another to be maintained, and wherein each of the first subset of nodes and the second subset of nodes belongs to a set of nodes each of which is configured to be placed in a power savings mode by the apparatus; and
- depowering means for causing a node that is not within the first subset or the second subset to enter the power savings mode.

* * * * *